US010781950B2

(12) United States Patent
Felber (10) Patent No.: US 10,781,950 B2
(45) Date of Patent: Sep. 22, 2020

(54) DEVICE FOR CONNECTING TUBULAR PIPE ELEMENTS

(71) Applicant: Winfried Felber, Monheim (DE)

(72) Inventor: Winfried Felber, Monheim (DE)

(*) Notice: Subject to any disclaimer, the term of this patent is extended or adjusted under 35 U.S.C. 154(b) by 978 days.

(21) Appl. No.: 14/981,079

(22) Filed: Dec. 28, 2015

(65) Prior Publication Data

US 2016/0178098 A1 Jun. 23, 2016

(30) Foreign Application Priority Data

Dec. 23, 2014 (DE) .................... 10 2014 119 501

(51) Int. Cl.
*F16L 21/00* (2006.01)
*F16L 21/06* (2006.01)
(Continued)

(52) U.S. Cl.
CPC ............. *F16L 25/14* (2013.01); *F16L 21/005* (2013.01); *F16L 21/06* (2013.01); *F16L 21/08* (2013.01); *F16L 25/0018* (2013.01)

(58) Field of Classification Search
CPC ......... F16L 25/14; F16L 21/005; F16L 21/06; F16L 21/08; F16L 23/006; F16L 23/032; F16L 3/10; F16L 3/13; F16L 37/14; F16L 3/1066; F16L 3/12; F16L 3/14; F16L 17/04; F16L 27/1133; F16L 27/59; F16L 27/025; F16L 21/00; F16L 21/002; F16B 7/22; F16B 7/0406; F16B 7/0426; F16B 7/04; F16B 2200/30; Y10T 403/551; Y10T 403/5773; Y10T 403/7094
(Continued)

(56) References Cited

U.S. PATENT DOCUMENTS 1,158,307 A * 10/1915 Schmidt ................. B23K 33/00
220/908
1,982,183 A * 11/1934 Tarbox .................... F16G 11/10
24/122.6
(Continued)

FOREIGN PATENT DOCUMENTS

DE 4333470 A1 4/1995
DE 202010013624 U1 12/2011
(Continued)

*Primary Examiner* — Zachary T Dragicevich
*Assistant Examiner* — William S. Choi
(74) *Attorney, Agent, or Firm* — Rimon, P.C.

(57) ABSTRACT

A device for connecting two tubular pipe elements, including a hollow cylindrical coupling device (4) with a hollow cylindrical first coupling device part (5) arranged on a first pipe element (2), and a hollow cylindrical second coupling device part (6) arranged on the second pipe element (3) that is axially connected to the first pipe element (2), wherein at least one first positive-locking element (7) is arranged on the first coupling device part (5) and at least one second positive-locking element (8) is arranged on the second coupling device part (6). The at least one first positive-locking element (7) arranged on the first coupling device part (5) and the at least one second positive-locking element (6) arranged on the second coupling device part (6) are designed to engage in a positive-locking manner, forming an axial connection of the first coupling device part (5) with the second coupling device part (6).

15 Claims, 6 Drawing Sheets (51) Int. Cl.
*F16L 21/08* (2006.01)
*F16L 25/08* (2006.01)
*F16L 25/00* (2006.01)
*F16L 25/14* (2006.01)

(58) Field of Classification Search
USPC ........ 285/330, 29, 86, 202, 288.6, 325, 363, 285/405, 408, 411, 921, 419, 12, 373
See application file for complete search history.

(56) References Cited

U.S. PATENT DOCUMENTS

| | | | | |
|---|---|---|---|---|
| 2,116,584 | A * | 5/1938 | Shelby | E06B 3/984 |
| | | | | 403/381 |
| 2,132,575 | A * | 10/1938 | Moise | F16L 13/0209 |
| | | | | 285/288.1 |
| 2,142,452 | A * | 1/1939 | Merrill | F16L 41/12 |
| | | | | 200/84 R |
| 2,448,769 | A * | 9/1948 | Chamberlain | F16L 21/005 |
| | | | | 16/108 |
| 3,104,898 | A * | 9/1963 | MacDonald | F16L 21/005 |
| | | | | 285/236 |
| 3,253,842 | A * | 5/1966 | Rabe | F16L 37/148 |
| | | | | 285/81 |
| 3,612,331 | A * | 10/1971 | Jorgensen | B01J 3/002 |
| | | | | 220/319 |
| 3,625,549 | A * | 12/1971 | De Vries | F16L 21/06 |
| | | | | 285/29 |
| 4,448,824 | A * | 5/1984 | Holmes | B29C 61/10 |
| | | | | 138/110 |
| 4,512,596 | A * | 4/1985 | Obrecht | E21B 17/043 |
| | | | | 285/81 |
| 5,001,816 | A * | 3/1991 | Oetiker | F16B 2/08 |
| | | | | 24/20 CW |
| 5,188,399 | A * | 2/1993 | Durina | F16L 37/252 |
| | | | | 285/148.26 |
| 5,857,713 | A * | 1/1999 | Horimoto | F16L 37/252 |
| | | | | 285/114 |
| 6,267,417 | B1 * | 7/2001 | Fan | F16L 17/04 |
| | | | | 285/330 |
| 7,044,507 | B2 * | 5/2006 | Ricard | F16L 37/113 |
| | | | | 285/330 |
| 7,168,151 | B2 * | 1/2007 | Niimi | H02K 15/02 |
| | | | | 29/463 |
| 7,530,607 | B2 * | 5/2009 | Luft | F16B 7/0406 |
| | | | | 285/402 |
| 8,147,162 | B1 * | 4/2012 | Burnett | F16B 5/0052 |
| | | | | 312/263 |
| 8,292,331 | B2 * | 10/2012 | Sudar | F16L 17/04 |
| | | | | 285/104 |
| 9,370,898 | B2 * | 6/2016 | Pettigrew | B29C 65/76 |
| 9,758,231 | B2 * | 9/2017 | Kluge | B63H 25/52 |
| 9,829,137 | B2 * | 11/2017 | Kennedy, Jr. | F16L 37/0925 |
| 2004/0094958 | A1 * | 5/2004 | Treverton | F16L 21/06 |
| | | | | 285/319 |
| 2005/0123346 | A1 | 6/2005 | Nakamura et al. | |
| 2008/0136175 | A1 * | 6/2008 | Hansen | F16L 19/065 |
| | | | | 285/245 |
| 2008/0185838 | A1 * | 8/2008 | Sudar | F16L 17/04 |
| | | | | 285/114 |
| 2008/0267543 | A1 * | 10/2008 | Wade | F16C 17/024 |
| | | | | 384/106 |
| 2009/0160183 | A1 * | 6/2009 | Felber | F16L 21/005 |
| | | | | 285/148.26 |
| 2010/0102549 | A1 * | 4/2010 | Radzik | F16L 17/04 |
| | | | | 285/112 |
| 2010/0117360 | A1 * | 5/2010 | Chan | F16L 21/005 |
| | | | | 285/373 |
| 2012/0061956 | A1 * | 3/2012 | Nijsen | F16L 21/04 |
| | | | | 285/374 |
| 2015/0093184 | A1 * | 4/2015 | Henry | E04B 1/2604 |
| | | | | 403/187 |
| 2018/0266588 | A1 * | 9/2018 | Netke | F16L 55/035 |

FOREIGN PATENT DOCUMENTS

| | | |
|---|---|---|
| EP | 2075497 A1 | 7/2009 |
| WO | 2006076464 A2 | 7/2006 |
| WO | 2010099569 A1 | 9/2010 |

* cited by examiner

DEVICE FOR CONNECTING TUBULAR PIPE ELEMENTS

CROSS-REFERENCE TO RELATED APPLICATIONS

This application claims priority to German Patent Application serial no. 10 2014 119 501.9 filed Dec. 23, 2014, the contents of which is incorporated herein by reference in its entirety as if set forth verbatim.

BACKGROUND OF THE INVENTION

The invention relates to a device for connecting two tubular pipe elements, in particular, two pipeline elements, of equal or unequal outer diameter.

Such types of devices for connecting two tubular pipe elements that is, for example, two pipeline elements of equal or unequal outer diameter, through which a liquid can flow, are basically known. Known areas of application of corresponding devices are in the area, for example, of civil engineering, in particular, pipework construction, or in the area of wastewater or sanitary engineering.

Essential demands placed on corresponding devices are, in particular, high mechanical stability of the connection produced or that can be produced by means of these devices between corresponding tubular pipe elements and a high degree of flexibility and practicality with respect to the possibility of connecting tubular pipe elements that have moderately differing outer diameters. In other words, by means of a single device, essentially a simple and reliable connection between a multitude of tubular pipe elements with moderately differing outer diameters should be possible. In particular, by means of a corresponding device, it should also be possible to connect two tubular pipe elements with significantly different outer diameters simply and reliably.

SUMMARY OF THE INVENTION

The object of the invention is to provide a device enabling a simple and reliable connection between two tubular pipe elements of equal or unequal outer diameter.

The object is achieved by means of a device for connecting two tubular pipe elements, in particular, two pipeline elements, of equal or unequal outer diameter, comprising the following:
a hollow cylindrical coupling device with a hollow cylindrical first coupling device part, which can be arranged on or is arranged on a first pipe element and a hollow cylindrical second coupling device part, which can be arranged on or is arranged on the second pipe element, which is to be axially connected or is connected to the first pipe element, wherein at least one first positive-locking element is arranged or formed on the first coupling device part and at least one second positive-locking element, in particular, corresponding to the at least one first positive-locking element, is arranged or formed on the second coupling device part, wherein the at least one first positive-locking element arranged or formed on the first coupling device part and the at least one second positive-locking element arranged or formed on the second coupling device part are designed to engage in a positive-locking manner, forming an axial connection of the first coupling device part with the second coupling device part.

The device described herein is generally used to connect, typically axially, two tubular pipe elements, in particular, two pipeline elements of equal or unequal outer diameter, through which a fluid, i.e. a liquid or gas, can flow. Pipe elements with different or the same outer diameters can thus be connected by means of the device. The pipe elements to be connected or that are connected are typically arranged positioned opposite one another with respective sections forming front faces or sides, in particular, butt-jointed, and, when the device is assembled, are encompassed by the device, forming an axial connection on the outer periphery of the device.

The device comprises a coupling device. The coupling device comprises a first hollow cylindrical coupling device part, which is referred to in the following in the shortened form as the first coupling device part, and a second hollow cylindrical coupling device part, which is referred to in the following in the shortened form as the second coupling device part. The first coupling device part and the second coupling device part each typically have a hollow cylindrical basic shape or are designed with such a shape or can be formed into such a shape. The term hollow cylindrical basic shape also essentially includes geometric shapes that deviate slightly from a geometrically obvious hollow cylinder such as ellipses, ovals, etc.

The first coupling device part can be arranged on or is arranged on a first pipe element (cf. the assembled device). The second coupling device part can be arranged on or is arranged on a second pipe element (cf. the assembled device) which can be connected to or is connected to the first pipe element (cf. the assembled device).

At least one first positive-locking element is arranged or formed on the first coupling device part. The first coupling device part thus has at least one first positive-locking element, or, typically, multiple first positive-locking elements. At least one second positive-locking element is arranged or formed on the second coupling device part. The second coupling device part thus has at least one second positive-locking element, or, typically, multiple second positive-locking elements. The at least one second positive-locking element typically, but not necessarily, corresponds with the at least one first positive-locking element arranged or formed on the first coupling device part.

Corresponding first positive-locking elements arranged or formed on the first coupling device part and corresponding second positive-locking elements arranged or formed on the second coupling device part are designed to engage with the second coupling device part in a positive-locking manner, forming an axial connection of the first coupling device part. By means of a corresponding axial connection between the first coupling device part and the second coupling device part, an axial connection can also obviously be realized or is realized between the first and the second coupling device part, which can be arranged on or is arranged on the first or second pipe elements accordingly.

An axial connection between the respective coupling device parts is established, as mentioned, by means of a positive-locking engagement between the respective first and second positive-locking element. The respective first and second positive-locking elements in this case can engage, in particular, axially and/or peripherally by interlocking; in any case, an axial connection between the respective coupling device parts is ensured. The term axial positive-locking engagement is understood to mean, in particular, an axial engagement of a first positive-locking element of a first coupling device part into an optionally corresponding second positive-locking element of a second coupling device part, or vice versa, and a resulting axial connection between the respective coupling device parts.

Specifically, to this end, a first positive-locking element, in the form of a section protruding axially from the first coupling device part, for example, can engage in a second positive-locking element in the form of a receiving section, optionally corresponding to the protruding section, on the second coupling device part.

The term peripheral positive-locking engagement is understood to mean, in particular, an encroachment or overlap of a first positive-locking element of a first coupling device part over an optionally corresponding second positive-locking element of a second coupling device part, or vice versa, and a resulting axial connection between the respective coupling device parts. Specifically, to this end, for example, a first positive-locking element, in the form of a section of the first coupling device part protruding in a circumferential direction, can encroach or overlap a second positive-locking element in the form of a section optionally corresponding to the section protruding from the second coupling device in a circumferential direction, peripherally, i.e. in a peripheral direction.

The axial connection between the two coupling device parts, which can be formed or is formed between the respective first and second positive-locking elements via the positive-locking engagement does not exclude certain radial and/or circumferential movements of the two coupling device parts relative to one another. In particular, a certain radial movement capacity of the two coupling device parts relative to one another in association with the connection of two pipe elements of unequal outer diameter may be useful. The aspect of the radial movement capacity of the two coupling device parts relative to another will be discussed below in more detail in connection with the guide elements optionally arranged or formed on the respective coupling device parts or corresponding coupling device part segments.

Essentially, the positive-locking engagement of the respective first and second positive-locking elements does not exclude other connection types of the respective coupling device parts, i.e. in particular, frictional connection types. Therefore, in particular, it is also possible for the respective first and second positive-locking elements to be realized with a certain axial frictional connection of the respective coupling device parts by means of the positive-locking engagement of the respective first and second positive-locking elements. Thus, an axial connection of the respective coupling device parts, which can be formed or is formed by the positive-locking engagement of the respective first and second positive-locking elements, can also (additionally) include specific characteristics of a friction connection. The coupling device parts can therefore be connected to one another axially by positive locking and friction locking. This in turn does not exclude a certain radial and/or circumferential movement capacity of the respective coupling device parts relative to one another, as described above.

Different geometrically shaped design options for the first and second positive-locking elements follow from the above statements. A first positive-locking element can be, for example, a protruding section, formed, in particular, with an undercut free end, preferably in a mushroom shape, or a seating section for such a protruding section. A first positive-locking element, however, can also be an encroaching or overlapping section, which protrudes from the first coupling device part in a circumferential direction, or from a first coupling device part segment, to be explained below, for circumferential encroachment or overlapping, at least in sections, of an optionally corresponding encroaching or overlapping section of the second coupling device part or of a second coupling device part segment, which is to be explained below, protruding in a circumferential direction.

In a similar manner, a second positive-locking element can likewise be a protruding section, designed, in particular, for example, with an undercut free end, preferably in a mushroom shape, or a seating section for such a protruding section. A second positive-locking element, however, can also be an encroaching or overlapping section, which protrudes from the second coupling device part in a circumferential direction or from a second coupling device part segment, to be explained below, for circumferential encroachment or overlapping, at least in sections, of an optionally corresponding encroaching or overlapping section of the first coupling device part or of a first coupling device part segment, which is to be explained below, protruding in a circumferential direction.

Of course, the first coupling device part can have the same or different first positive-locking elements in a circumferential direction, in particular, directly alternating in a circumferential direction, and the second coupling device part can have the same or different second positive-locking elements in a circumferential direction, in particular, directly alternating in a circumferential direction. In this manner, the stability of the axial connection of the two coupling device parts formed by means of the positive-locking engagement between the respective first and second positive-locking elements can be increased, in particular, with respect to forces acting axially.

The axial connection of the first coupling device part with the second coupling device part, which can be formed by means of the respective first and second positive-locking elements, can be detachable (without damage or destruction) or not detachable (without damage or destruction), i.e. non-detachable. The question as to whether the axial connection of the first coupling device part with the second coupling device part, which can be formed by means of the respective first and second positive-locking elements, is detachable or non-detachable is determined, in particular, as a result of the concrete geometric design of the first and second positive-locking elements. With respect to an axial connection which cannot be detached or is non-detachable, the first and/or the second positive-locking elements can be equipped with fastening elements, e.g. in the form of latching or clamping elements, which engage fastening elements such that the respective first and second positive-locking elements cannot be detached from one another without causing damage or destruction.

The first coupling device part and/or the second coupling device part can each be designed as a single part. The first coupling device part or the second coupling device part can thus be formed from a hollow cylindrical, in particular, annular body with first or second positive-locking elements arranged or formed thereon.

At the same time, it is also possible for the first coupling device part and/or the second coupling device part to be formed in multiple pieces or multiple parts. Multi-piece or multi-part design of the first coupling device part and/or the second coupling device part is especially advantageous with respect to the operation and thus the practicality of the device, as well as for production aspects and thus economical aspects.

In a multi-piece or multi-part version, the first coupling device part can be formed so as to be peripherally segmented. Here, the first coupling device part can be formed from multiple first coupling device part segments that can be connected or are connected to the first coupling device part in a circumferential direction (in particular, when the device is assembled). Accordingly, the second coupling device part in a multi-piece or multi-part version can be designed as peripheral segments. The second coupling device part, in this case, can be formed from multiple second coupling device part segments that can be connected or are connected to the second coupling device part in a circumferential direction (in particular, when the device is assembled).

A corresponding first coupling device part segment can have at least one bar-shaped base section, hereinafter referred to simply as the base section. The longitudinal axis of a corresponding base section typically extends in an axial direction when the device is assembled. At least one first positive-locking element can be arranged or formed on a first free axial end or in the area of a first free axial end of the base section. At this juncture, it should be noted that a first coupling device part segment with a (single) base section, having at least one first positive-locking element arranged or formed on a first free axial end or in the area of a first free axial end of the base section, can be considered a basic structural unit for forming a corresponding segmented first coupling device part. Accordingly, a first coupling device part can be formed or assembled from multiple comparatively simply designed, individual first coupling device part segments to be connected or that are connected in a circumferential direction.

In a similar manner, a second coupling device part segment can also have at least one bar-shaped base section, hereinafter also simply referred to as the base section. The longitudinal axis of a corresponding base section typically extends in an axial direction when the device assembled. At least one second positive-locking element can be arranged or formed on a first free axial end or in the area of a first free axial end of the base section. Likewise, it should also be noted here that a second coupling device part segment with a (single) base section, having at least one second positive-locking element arranged or formed on a first free axial end or in the area of a first free axial end of the base section, can be considered a basic structural unit for forming a correspondingly segmented second coupling device part. Accordingly, a second coupling device part can be formed or assembled from multiple comparatively simply designed, individual second coupling device part segments to be connected or that are connected in a circumferential direction.

A first coupling device part segment can also have multiple base sections. The longitudinal axis of the base sections typically extend in an axial direction when the device the assembled. The base sections can be arranged parallel or aligned at an angle with respect to one another. An angled arrangement of the corresponding base sections means that, when viewed from the top, the device will typically have a V-like or V-slot-like arrangement of two base sections arranged directly adjacent to one another in a circumferential direction. Here, the base sections form the sides of the V. Depending on the viewing direction, the V formed by the two directly adjacent base sections can be open axially in one direction or the other. An angled arrangement of the corresponding directly adjacent base sections can be reversed when the device is assembled since the base sections can be tensioned with respect to one another, typically in a circumferential direction, when the device is assembled, such that they are arranged in a parallel alignment, in particular, directly adjacent to one another.

Regardless of the geometric arrangement of two base sections of a first coupling device part segment arranged directly adjacent to one another in a circumferential direction, two base sections arranged directly adjacent to one another in a circumferential direction can be connected to one another, in particular, in a circumferential direction, at the first free axial end or in the area of the first free axial end of the first coupling device part segment via a connection section. A corresponding connection section ensures a connection, in a circumferential direction, of at least two connection sections arranged adjacent to one another in a circumferential direction. A corresponding connection section can have a plate-like or plate-shaped geometric shape. At least one first positive-locking element can be arranged or formed on a corresponding connection section.

In principle, it is also possible for two base sections arranged directly adjacent to one another in a circumferential direction to be connected to one another, in particular, in a circumferential direction, at a second free axial end positioned opposite the first free axial end or in the area of such a second free axial end of a first coupling device part segment by means of an additional connection section. A corresponding additional connection section can likewise have a plate-like or plate-shaped geometric shape. Corresponding connection sections arranged or formed on or in the area of a first free axial end and additional corresponding connection sections arranged or formed on or in the area of a second free axial end can be arranged offset with respect to one another in a circumferential direction, in particular, by at least one base section, i.e. by the width of a base section.

Of course, a second coupling device part segment can have multiple base sections in a similar manner. The longitudinal axis of the base sections typically extends in an axial direction when the device is assembled. The base sections can be arranged parallel or aligned at an angle with respect to one another. Here, an angled arrangement of the corresponding base sections also means that, when viewed from the top, the device will typically have a V-like or V-slot-like arrangement of two base sections arranged directly adjacent to one another in a circumferential direction. Here, the base sections form the sides of the V. Depending on the viewing direction, the V formed by the two directly adjacent base sections can be open axially in one direction or the other. An angled arrangement of the corresponding directly adjacent base sections can also be reversed in this case when the device is assembled since the base sections can be tensioned with respect to one another, typically in a circumferential direction, when the device is assembled, such that they are arranged in a parallel alignment, in particular, directly adjacent to one another.

Regardless of the geometric arrangement of two base sections of a second coupling device part segment arranged directly adjacent to one another in a circumferential direction, two base sections arranged directly adjacent to one another in a circumferential direction can be connected to one another, in particular, in a circumferential direction, via a connection section at the first free axial end or in the area of the first free axial end of the second coupling device part segment. A corresponding connection section ensures a connection, in a circumferential direction, of at least two connection sections arranged adjacent to one another in a circumferential direction. A corresponding connection section can have a plate-like or plate-shaped geometric shape. At least one second positive-locking element can be arranged or formed on a corresponding connection section.

In principle, it is also possible here for two base sections arranged directly adjacent to one another in a circumferential direction to be connected to one another, in particular, in a circumferential direction, by means of an additional connection section at a second free axial end positioned opposite the first free axial end or in the area of such a second free axial end of a second coupling device part segment. A corresponding additional connection section can likewise have a plate-like or plate-shaped geometric shape. Corresponding connection sections arranged or formed on or in the area of a first free axial end and additional corresponding connection sections arranged or formed on or in the area of a second free axial end can be arranged offset with respect to one another in a circumferential direction by at least one base section.

It is conceivable for at least two base sections of a first coupling device part segment, which are arranged directly adjacent to one another in a circumferential direction, to be connected with one another, in particular, in a circumferential direction, at or in the area of their respective first free ends positioned opposite the second free axial ends by means of, in particular, a bow-like or U-shaped connection element. If corresponding additional connection sections are provided, the corresponding connection sections serve, in particular, to connect two additional connection sections arranged directly adjacent to one another in a circumferential direction to one another. Corresponding connection elements are used, in particular, to prevent radial expansion or radial displacement of respective base sections in the area of the second free axial end. Furthermore, corresponding connection elements are used, in particular, to absorb pressure and/or tension forces, in particular, acting in a circumferential direction, when the first coupling device part segment is assembled or the device is assembled.

Corresponding connection elements can be formed from multiple connection element segments or comprise multiple connection element segments. Corresponding connection element segments can provide the connection element with flexibility in various degrees of freedom, i.e. in particular, in an axial direction, in a radial direction, and in a circumferential direction, such that the intermediate connecting parts connected to one another by the connection element can be moved arbitrarily relative to one another. In particular, compression and expansion movements of the connection element are possible so that peripherally adjacent intermediate connecting parts can converge on one another to a certain extent or can be spaced apart from one another by a certain distance in a circumferential direction.

Corresponding connection element segments can be formed from a material that is more elastically flexible in comparison with the intermediate connecting parts, e.g. a thermoplastic elastomer that can be injection-molded and thus processed within the scope of an injection-molding process (e.g. in comparison with a comparably rigid polymer, such as polyamide, polycarbonate, etc. for forming the respective intermediate connecting parts), or provided with a more elastically flexible material structure, e.g. by means of slots. Of course, it is also possible to produce the respective connection element segments and respective intermediate connecting parts from the same material, which can result in production advantages.

Corresponding connection elements can thus be formed in a circumferential direction to be elastically flexible, at least in sections. The elastically flexible properties of corresponding connection elements can be influenced in a targeted manner by design parameters, such as, in particular, wall thicknesses, with respect to a specific application situation of a first coupling device part segment or the device. The elastically flexible properties can be realized in the design, for example, by means of a bow-like or U-shaped, generally curved design of the corresponding connection elements. The curve can be aligned in the direction of the first or the second free axial end of the first coupling device part segment, when viewed axially. Of course, corresponding elastically flexible properties of corresponding connection elements can also be realized, for example, by means of a V-like or V-shaped design.

In a similar manner, it is conceivable for at least two base sections of a second coupling device part segment, which are arranged directly adjacent to one another in a circumferential direction, to be connected to one another, in particular, in a circumferential direction, at or in the area of the respective second free axial ends positioned opposite their first free ends by means of, in particular, a bow-like or U-shaped connection element. If corresponding additional connection sections are provided, the corresponding connection sections serve, in particular, to connect two additional connection sections, arranged directly adjacent to one another in a circumferential direction, to one another in a circumferential direction. Corresponding connection elements are used, in particular, to prevent radial expansion or radial displacement of respective base sections in the area of the second free axial end. Furthermore, corresponding connection elements are used, in particular, to absorb pressure and/or tension forces, in particular, acting in a circumferential direction, when the second coupling device part segment is assembled or the device is assembled.

Thus, corresponding connection elements can likewise be designed to be elastically flexible in a circumferential direction, at least in sections. The elastically flexible properties of corresponding connection elements can be influenced in a targeted manner by design parameters, such as, in particular, wall thicknesses, with respect to a specific application situation of a second coupling device part segment or the device. The elastically flexible properties can be realized in the design, for example, by means of a bow-like or U-shaped, generally curved design of the corresponding connection elements. The curve can be aligned in a direction of the first or the second free axial end of the second coupling device part segment, when viewed axially. Of course, corresponding elastically flexible properties of corresponding connection elements can also be realized, for example, by means of a V-like or V-shaped design.

A first lug-like retaining section, which is radially elevated (toward the outside) with respect to the base section, can be formed on or in the area of the first free axial end of the at least one base section of at least one first coupling device part segment, and a second lug-like retaining section, which is radially elevated (toward the outside) with respect to the base section, can be formed on or in the area of a second free axial end, positioned opposite the first free axial end, of at least one base section of at least one first coupling device part segment. A retaining area for retaining a part of a strip-, sleeve-, or clamp-like tension element tensioning the first coupling device part, in particular, in a circumferential direction, can be formed by the at least one first lug-like seating section and the at least one second lug-like seating section. Respective lug-like seating sections form a respective axial stop for a corresponding tension element and can thus define a channel-like or channel-shaped retaining area, which can also be characterized as or considered a "tension element channel," for seating a part of a corresponding tension element. A corresponding seating section can have, for example, a U-shape in a longitudinal section through the device. Of course, it is also possible for only corresponding first lug-like seating sections or only corresponding second lug-like seating sections to be provided, each of which forms a respective axial stop for a corresponding tension element.

In a similar manner, a first lug-like seating section, which is radially elevated (toward the outside) with respect to the base section, can be formed on or in the area of the first free axial end of the at least one base section of at least one second coupling device part segment, and a second lug-like retaining section, which is radially elevated (toward the outside) with respect to the base section, can be formed on or in the area of a second free axial end, positioned opposite the first free axial end, of at least one base section of at least one second coupling device part segment. A seating section for seating a part of a strip-, sleeve-, or clamp-like tension element tensioning the second coupling device part, in particular, in a circumferential direction, can be formed by the at least one first lug-like seating section and the at least one second lug-like seating section. Respective lug-like seating sections form a respective axial stop for a corresponding tension element and can thus define a channel-like or channel-shaped seating section, which can also be characterized as or considered a "clamping element channel," for seating a part of a corresponding tension element. A corresponding seating section can have, for example, a U-shape in a longitudinal section through the device. Of course, it is also possible for only corresponding first lug-like seating sections or only corresponding second lug-like seating sections to be provided, each of which forms a respective axial stop for a corresponding tension element.

Furthermore, at least one wing-like stop element protruding in a circumferential direction can be arranged or formed in at least one lug-like seating section, or in particular, in two first lug-like seating sections arranged adjacent to one another in a circumferential direction, of a first coupling device part segment. A corresponding wing-like stop element protruding in a circumferential direction can be tensioned or is tensioned in a circumferential direction against a section of the second coupling device part positioned opposite this when the first coupling device part is assembled or the device is assembled. Corresponding stop elements thus enable peripheral tensioning of the first coupling device part against a second coupling device part, which promotes a stable axial connection between the respective pipe elements. Corresponding wing-like stop elements of a first coupling device part segment can be arranged or formed, for example, in the area of a first positive-locking element forming a seating for a mirror-inverted second positive-locking element. Corresponding contact elements, if present, can be identical to corresponding further encroachment or overlapping sections as previously mentioned.

In a similar manner, at least one wing-like stop element protruding in a circumferential direction can be arranged or formed in at least one first lug-like seating section, or in particular, in two first lug-like seating sections arranged adjacent to one another in a circumferential direction, of a second coupling device part segment. A corresponding wing-like stop element protruding in a circumferential direction can be tensioned or is tensioned in a circumferential direction against a section of the first coupling device part positioned opposite this when the second coupling device part is assembled or the device is assembled. Corresponding stop elements thus enable peripheral tensioning of the second coupling device part against a first coupling device part, which promotes a stable axial connection between the respective pipe elements. Corresponding wing-like stop elements of a second coupling device part segment can be arranged or formed, for example, in the area of a second positive-locking element forming a seating for a mirror-inverted first positive-locking element. Here, too, corresponding stop elements, if present, can be identical to corresponding further encroachment or overlapping sections as previously mentioned.

Corresponding stop elements can have a geometric shape rising upward toward the exterior, in a radial direction, in particular, at least conical or ramp-like in sections or at least bent or curved in sections (cf. the hollow cylindrical basic shape of a respective coupling device part referred to). Stop elements of a first coupling device part segment or of a second coupling device part segment arranged adjacent to one another in a circumferential direction can be aligned in opposite directions in a circumferential direction; thus, for example, a first stop element can have a geometric shape rising upward toward the exterior, aligned counterclockwise, in a radial direction; a second contact element arranged adjacent in a circumferential direction can correspondingly have a geometric shape rising upward toward the exterior, aligned counterclockwise, in a radial direction.

In order to realize a peripheral connection between the first coupling device part segments, which is required to form the first coupling device part, a connection element can be arranged or formed on at least one base section of a first coupling device part segment for the peripheral connection of the first coupling device part segment with an optionally corresponding connection element of an additional first coupling device part segment. A corresponding connection element can be formed, for example, as a radial, in particular, pin-like, optionally undercut, latching protrusion of a corresponding connection element as, in particular, a breach-like, latch seating for the latching protrusion.

For the same purpose, a connection element can be arranged or formed in a similar manner in at least one base section of a second coupling device part segment for the peripheral connection of the second coupling device part segment with an optionally corresponding connection element of an additional second coupling device part segment. Here, too, a corresponding connection element can also be formed, for example, as a radial, in particular, pin-like, optionally undercut, latching protrusion of a corresponding connection element as, in particular, a breach-like, latch seating for the latching protrusion.

Respective first coupling device part segments for forming the or a first coupling device part and respective second coupling device part segments for forming the or a second coupling device part can be identical, i.e. formed with identical geometric dimensions, i.e. in particular, with an identical geometric shape. This results in an especially advantageous aspect of the device, which can be seen in that a complete first coupling device part, a complete second coupling device part, and thus a complete coupling device can be formed or assembled with multiple geometrically identical structural elements from a single type. Thus, only one single structural type must be produced or retained in order to form or assemble a complete coupling device. The production and storage outlay for forming the device is thus simplified significantly. In this context, it should again be noted that a first or a second coupling device part segment with a (single) base section, generally a certain number of base sections, having at least one first or second positive-locking element arranged or formed on a first free axial end or in the area of a first free axial end of the or a base section, can be considered a basic structural unit for forming a correspondingly segmented first or second coupling device part.

At least one first guide element can be arranged or formed on the first coupling device part or on at least one first coupling device part segment, and at least one second guide element, optionally corresponding, of the at least one first guide element, can be arranged or formed on the second coupling device part or on at least one second coupling device part segment. The at least one first guide element arranged or formed on the first coupling device part or the at least one first coupling device part segment and the at least one second guide element arranged or formed on the second coupling device part or on the at least one second coupling device part segment, can be designed to engage, forming a guide of the first coupling device part and of the second coupling device part or at least one first coupling device part segment and at least one second coupling device part segment, which can be moved relative to one another in a radial direction. In this respect, corresponding guide elements can also be considered or characterized as radial guide elements. Corresponding guide elements can be arranged or formed, in particular, at corresponding connection sections, formed on respective first free axial ends or in the area of respective first free axial ends of respective first or second coupling device part segments.

The engagement of corresponding first and second guide elements is suitable, in particular, with respect to the connection of pipe elements of unequal outer diameter since a targeted change of the inner diameter of the first coupling device part or of the inner diameter of the second coupling device part, or vice versa, is made possible by means of corresponding radial movements, typically radial displacements, of the first coupling device part or respective first coupling device part segments relative to the second coupling device part or respective second coupling device part segments, or vice versa. The coupling device can thereby be adapted to different outer diameters of the pipe elements to be connected in a comparatively simple manner. Depending on the radial extension of the respective guide elements, pipe elements with significantly different outer diameters can be simply and reliably connected.

It should be noted that corresponding guide elements can be designed identically, with respect to the geometric construction, with corresponding positive-locking elements having coupling device part segments on the side. In other words, corresponding positive-locking elements can not only be designed to engage with the or a second coupling device part in a positive-locking manner, forming an axial connection of the or of a first coupling device part, but are also designed to engage, forming a guide of the or of a first coupling device part and of the or of a second coupling device part or at least one first coupling device part segment and at least one second coupling device part segment, which can move in a radial direction relative to one another.

More specifically, this can be realized, for example, by respective first positive-locking elements or a respective second positive-locking element in the form of a protruding section formed, in particular, with an undercut free end, preferably in a mushroom shape, or a receiving section for such a protruding section since these positive-locking elements typically enable a guide of the first coupling device part and of the second coupling device part or at least one first coupling device part segment and at least one second coupling device part segment, which can move in a radial direction relative to one another.

With respect to the axial connection of the first coupling device part and of the second coupling device part, there are essentially two different possibilities. On one hand, the first coupling device part and the second coupling device part can be connected directly to one another in an axial direction. The direct axial connection of the two coupling device parts is, in particular, advantageous with respect to the absorption of forces acting axially.

On the other hand, the first coupling device part and the second coupling device part can be connected indirectly to one another in an axial direction with the interconnection of at least one intermediate connecting part. By means of interconnecting corresponding intermediate connecting parts, the axially bridgeable distance between two pipe elements to be connected can essentially be expanded (practically) arbitrarily by means of the coupling device. In connection with the corresponding radial guide elements referred to above and on the part of the coupling device parts or respective coupling device part segments, as well as on the part of corresponding intermediate connecting parts, the radially bridgeable distance between two pipe elements of unequal outer diameter to be connected by means of the coupling device can likewise essentially be expanded (practically) arbitrarily.

Different configuration options of intermediate connecting parts will be explained in the following. A corresponding intermediate connecting part can have, for example, at least one positive-locking element for connecting to a first positive-locking element of the first coupling device part or of a first coupling device part segment and at least one positive-locking element for connecting with a second positive-locking element of the second coupling device part or of a second coupling device part segment. It is also conceivable for a corresponding intermediate connecting part to have at least one positive-locking element for connecting with a first positive-locking element of the first coupling device part or of a first coupling device part segment or for connecting with a second positive-locking element of the second coupling device part or of a second coupling device part segment and at least one positive-locking element for connecting with an additional intermediate connecting part. Furthermore, it is conceivable for an intermediate connecting part only to have positive-locking elements for connecting with an additional intermediate connecting part. In this case, additional intermediate connecting parts are to be provided in any case, which enable connection with the first coupling device part or at least one first coupling device part segment and the second coupling device part or at least one second coupling device part segment.

When considered from a geometric-constructive perspective, corresponding intermediate connecting parts can likewise have a bar-shaped base section. Corresponding positive-locking elements arranged or formed on an intermediate connecting part are typically arranged or formed on or in the area of their respective free axial ends.

Of course, corresponding intermediate connecting parts can also be designed with corresponding lug-like retaining sections raised radially (toward the exterior) with respect to a corresponding base section. Respective lug-like retaining sections can form a respective axial stop for an additional tension element and can thus likewise define a corresponding channel-like or channel-shape seating area for retaining a part of a further tension element.

Furthermore, it is also possible for at least one stop element, protruding in a circumferential direction, to be arranged or formed on corresponding intermediate connecting parts, which can be tensioned or is tensioned in a circumferential direction against a section of a coupling device part opposite this when the device is assembled. The above statements in connection with stop elements arranged or formed on respective coupling device parts or coupling device part segments apply similarly.

At least two intermediate connecting parts arranged adjacent to one another in a circumferential direction can be connected to one another by means of at least one, in particular, strip-like or strip-shaped connection element connecting these in a circumferential direction. The connection element can be formed from connection element segments extending at an angle, in particular, V-like, with respect to one another, when viewed radially, with the segments being able to be tensioned or being tensioned against one another in a circumferential direction when the device is assembled. In this manner, the stability of the connection, which can be formed by the device between the two pipe elements, can be increased.

In order to ensure a reliable, leak-proof connection of corresponding pipe elements, the device typically comprises at least one, in particular, hollow cylindrical sealing element for an arrangement that is sealed at least in sections at the inner periphery of the first coupling device part and/or at the inner periphery of the second coupling device part. The sealing element is typically formed from a sealing material, in particular, an elastomer material such as a natural or synthetic rubber.

The device further typically comprises at least one, in particular, step-, sleeve-, or clamp-like tension element for tensioning the first coupling device part against a first pipe element that can be arranged or is arranged on the first coupling device part, and/or at least one, in particular, strip-, sleeve-, or clamp-like tension element for tensioning the second coupling device part against a second pipe element that can be arranged or is arranged on the second coupling device part. A corresponding tension element enables a captive centric arrangement of corresponding coupling device parts on a pipe element arranged on these. Respective coupling device parts can be tensioned against the outer diameter of a pipe element arranged on these by means of a corresponding tension element.

The invention further relates to a coupling device part for a coupling device of a device, as described, for connecting two tubular pipe elements of equal or unequal outer diameter. At least one positive-locking element is arranged or formed on the coupling device part. The at least one positive-locking element is designed to engage with at least one, optionally corresponding, positive-locking element of a second coupling device part, forming a positive-locking axial connection between the coupling device part and the second coupling device part.

With respect to the coupling device part, all of the observations, in particular, all of the observations relevant to the coupling device part, apply similarly with respect to the device.

BRIEF DESCRIPTION OF THE DRAWINGS

Additional advantages and individual details of the invention will emerge from the exemplary embodiments described in the following and the corresponding drawing. Here.

DETAILED DESCRIPTION

Figure 1:
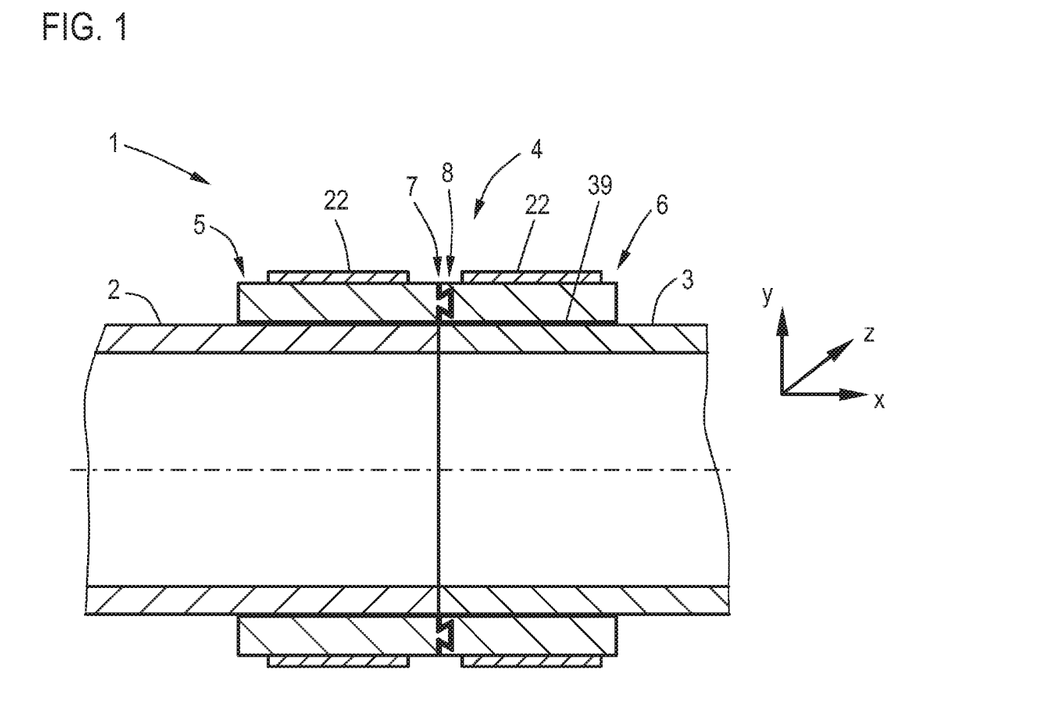
FIG. 1, 2 each depict a schematic drawing of a device in accordance with an exemplary embodiment.

FIG. 1 is a schematic depiction of a longitudinal sectional view of a device 1 in accordance with an exemplary embodiment of the invention. The device 1 is used to connect two pipe elements 2, 3, that is, for example, two pipeline elements of equal or unequal outer diameter, through which a liquid can flow, used in civil engineering or in pipeline construction.

The device 1 comprises a coupling device 4. The coupling device 4 comprises a first hollow cylindrical coupling device part 5 and a second hollow cylindrical coupling device part 6. The first coupling device part 5 and the second coupling device part 6 each have a hollow cylindrical basic shape or are formed with such a shape or can be formed into such a shape.

The first coupling device part 5 is arranged on the first pipe element 2. The second coupling device part 6 is arranged on the second pipe element 3 to be connected to the first pipe element 2 or connected when the device 1 is assembled, as shown in FIG. 1.

The first positive-locking elements 7 are formed, in a circumferentially adjacent arrangement, on the front face of the first coupling device part 5, i.e. in the area of a first free axial end of the first coupling device part 5. The second positive-locking elements 8 are formed, in a circumferentially adjacent arrangement, on the front face of the second coupling device part 6, i.e. in the area of a first free axial end of the second coupling device part 6. It can be seen that the respective first positive-locking elements 7 of the first coupling device part 5 of the respective second positive-locking elements 8 of the second coupling device part 6 are arranged axially opposite one another.

The respective first positive-locking elements 7 formed on the first coupling device part 5 and the respective second positive-locking elements 8 formed on the second coupling device part 6 are designed to engage with the second coupling device part 6 in a positive-locking manner, forming an axial connection of the first coupling device part 5. Here, in particular, the respective first and second positive-locking elements 7, 8 engage in an axial direction and in a positive-locking manner. Due to a corresponding axial connection of the first coupling device part 5 with the second coupling device part 6, an axial connection of the pipe element 2 with the pipe element 3 can also be realized or is realized.

Figure 8:
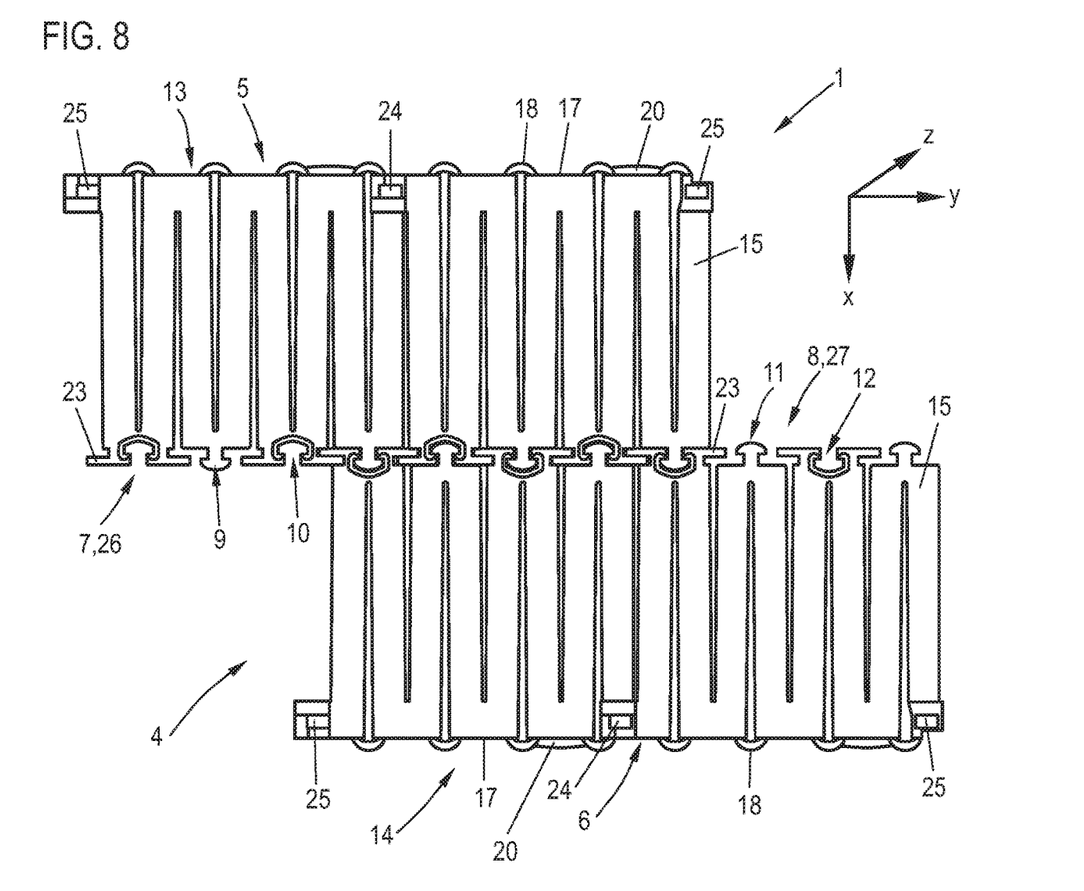

The first positive-locking elements 7 are in the form of sections 9 formed with a preferably mushroom-shaped, undercut free end protruding axially from the front of the first coupling device part 5 and axial seating sections 10 for receiving corresponding second positive-locking elements 8 in the form of sections 11 formed with a preferably mushroom-shaped, undercut free end, protruding axially from the front of the second coupling device part 6 (cf. in particular, FIG. 8). The protruding sections 9 or seating sections 10 forming the first positive-locking elements 7 are designed so as to alternate in a circumferential direction.

The second positive-locking elements 8 are designed in the form of the sections 11 referred to, with a preferably mushroom-shaped, undercut free end protruding axially from the second coupling device part 6 and axial seating sections 12 for receiving corresponding first positive-locking elements 7 in the form of sections 9 protruding axially from the first coupling device part 5 (cf., in particular, FIG. 8). The protruding sections 11 or seating sections 12 forming the second positive-locking elements 8 are designed so as to alternate in a circumferential direction.

Alternating differently designed first and second positive-locking elements 7, 8 are thus formed, both on the side of the first coupling device part 5 and on the side of the second coupling device part 6.

The axial connection, which can be formed between the first coupling device part 5 and the second coupling device part 6 via the respective first and second positive-locking elements 7, 8, is detachable (without damage or destruction) in the exemplary embodiments shown in the figures. In principle, the axial connection between the first coupling device part 5 and the second coupling device part 6, which can be formed via the respective first and second positive-locking elements 7, 8, can also, however, be non-detachable (without damage or destruction). With respect to a non-detachable, axial connection, the first positive-locking elements 7 and/or the second positive-locking elements 8 can be equipped with fastening elements (not shown), e.g. in the form of latching or tension elements, which engage fastening elements such that the respective first and second positive-locking elements 7, 8 cannot be detached from one another without causing damage or destruction.

FIG. 3-8 show that the first coupling device part 5 and the second coupling device part 6 can each be segmented peripherally and can thus be designed as multi-piece or multi-part devices. The first coupling device part 5 is formed from multiple first coupling device part segments 13 that can be connected or are connected in a circumferential direction to the first coupling device part 5, as indicated in a view of the two coupling device parts 5, 6 in FIG. 8; accordingly, the second coupling device part 6 can be formed from multiple second coupling device part segments 14 that can be connected or, as shown in the view of the two coupling device parts 5, 6 in FIG. 8, are connected to the second coupling device part 6 in a circumferential direction.

FIG. 3-8 depict perspective views (cf. FIG. 3-5), top views (cf. FIG. 6, 8), and a side view (cf. FIG. 7) of different exemplary embodiments of corresponding first and second coupling device part segments 13, 14.

What the different exemplary embodiments depicted in FIG. 3-8 of corresponding first and second coupling device part segments 13, 14 have in common is at least one bar-shaped base section 15. At least one first positive-locking element 7 is formed on the or a first free axial end of at least one corresponding base section 15 of a first coupling device part segment 13. At least one second positive-locking element 8 is formed on the first free axial end of at least one corresponding base section 15 of a second coupling device part segment 14. As FIG. 8 shows, respective first free axial ends of respective coupling device part segments 13, 14 are positioned opposite one another when the device 1 is assembled, when viewed axially. The longitudinal axis of respective base sections 15 extends in an axial direction when the device 1 is assembled (cf. x-direction).

Figure 3:
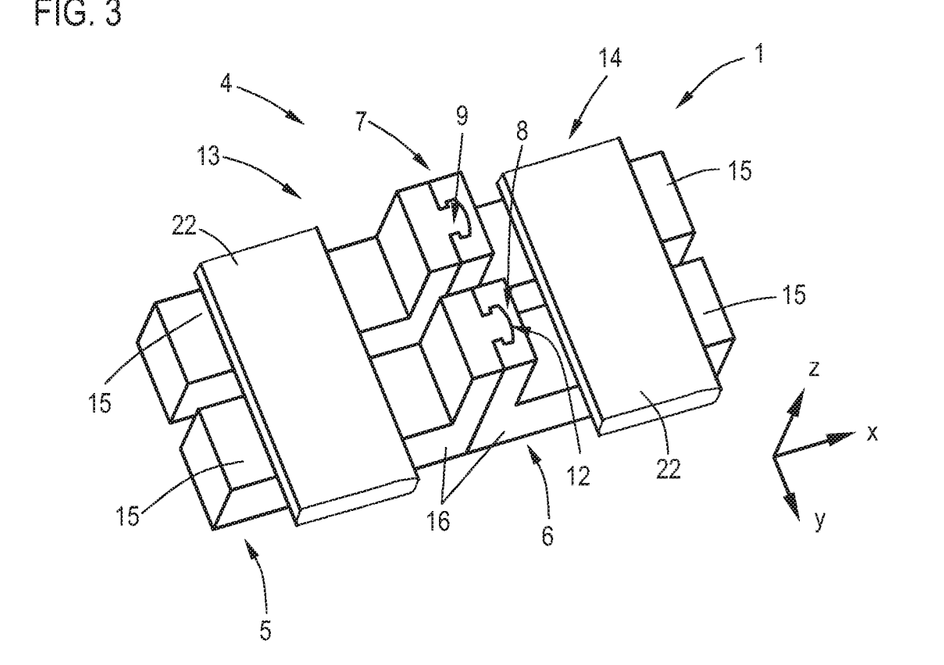
FIG. 3-8 each depict a schematic drawing of a first or a second coupling device part segment in accordance with an exemplary embodiment.
Figure 4:
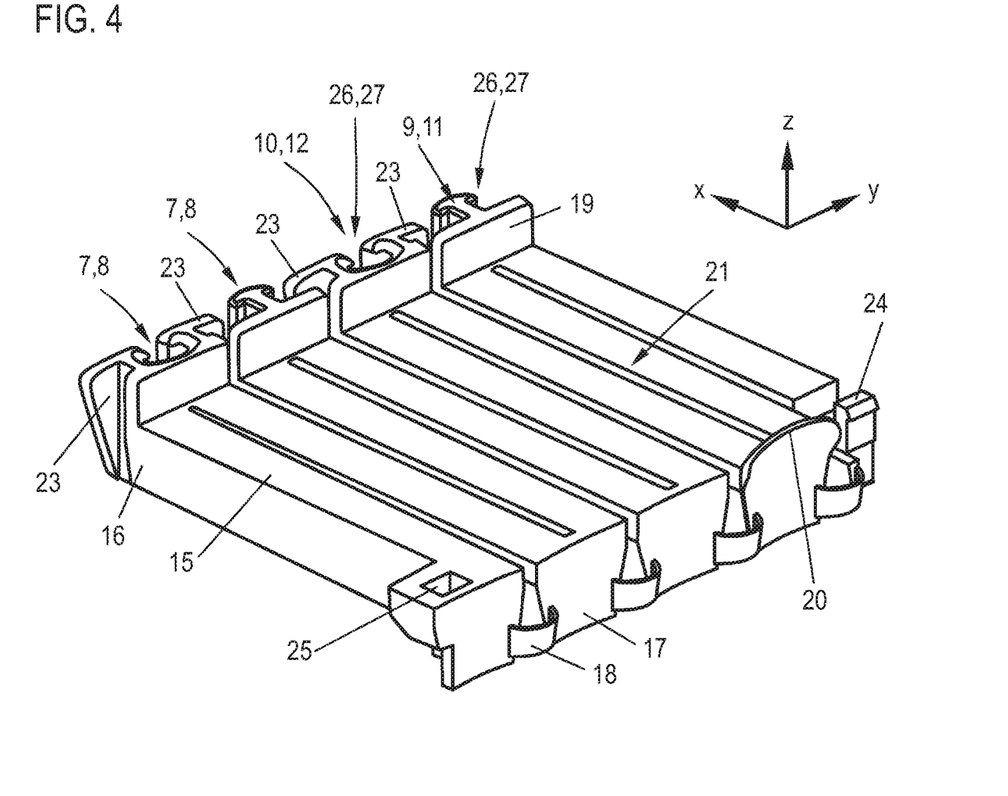

FIG. 3 depicts a first exemplary embodiment of first and second coupling device part segments 13, 14. Here, corresponding first coupling device part segments 13 have a (single) base section 15 with a (single) first positive-locking element 7 formed on a first free axial end of the base section 15 in the form of a corresponding axially protruding undercut section 9; in this case, corresponding second coupling device part segments 14 have a (single) base section 15 with a (single) second positive-locking element 8 formed on a first free axial end of the base section 15 in the form of a corresponding protruding receiving section 12.

FIG. 4-7 depict a further exemplary embodiment of first and second coupling device part segments 13, 14. Here, corresponding first coupling device part segments 13 and corresponding second coupling device parts 14 each have multiple base sections 15. The base sections 15 are arranged aligned at an angle with respect to one another. FIG. 4-7 show that an angled arrangement of corresponding base sections 15 has a V-like arrangement of two base sections 15 arranged directly adjacent to one another in a circumferential direction (cf. y-direction). Here, the base sections 15 form the sides of the V. The angled arrangement of the corresponding directly adjacent base sections 15 can be reversed when the device 1 is assembled as the base sections 15 can be tensioned with respect to one another, typically in a circumferential direction, when the device 1 is assembled, such that they are arranged in a parallel alignment, in particular, so as to be directly adjacent to one another.

It can be seen that each of the two base sections 15 of the respective first and second coupling device part segments 13, 14 arranged directly adjacent to one another in a circumferential direction are connected to one another in the area of the respective first free axial ends via plate-like connection sections 16, in particular, in a circumferential direction. Corresponding connection sections 16 ensure a connection in a circumferential direction of the respective first free axial ends of the two base sections 15 of a respective coupling device part segment 13, 14, arranged directly adjacent to one another, in a circumferential direction. It can be seen that the respective first positive-locking elements 7 and the respective second positive-locking elements 8 are formed on corresponding connection sections 16 or the area of the corresponding connection sections 16.

Two base sections 15 arranged directly adjacent to one another in a circumferential direction are connected to one another in the area of a second free axial end positioned opposite the first free axial end by means of additional plate-like connection sections 17, in particular, in a circumferential direction. Corresponding additional connection sections 17 ensure a connection in a circumferential direction of the respective first free axial ends of two base sections 15 of a respective coupling device part segment 13, 14 arranged directly adjacent to one another in a circumferential direction. It can be seen that the respective first connection sections 16 and the respective additional connection sections 17 are arranged offset to one another in a circumferential direction by one base section 15, i.e. by the width of a base section 15.

Furthermore, two base sections 15 of the respective first or second coupling device part segments 13, 14, arranged directly adjacent to one another in a circumferential direction, are connected to one another in the area of their respective second free axial ends via a wing-like curved connection element 18, in particular, in a circumferential direction. Since corresponding additional connection sections 17 are provided in the exemplary embodiment shown in FIG. 4-8, corresponding connection sections 18 serve, in particular, to connect two additional connection sections 17 arranged directly adjacent to one another in a circumferential direction to one another. The connection elements 18 prevent radial expansion and radial displacement of the respective base sections 15 in the area of the respective second free axial ends. Furthermore, corresponding connection elements 18, in particular, in a circumferential direction, absorb pressure and/or tension forces, in particular, acting in a circumferential direction, when the device 1 is assembled.

Corresponding connection elements 18 are thus designed to be elastically flexible in a circumferential direction, at least in sections. The elastically flexible properties of the connection elements 18 can be influenced in a targeted manner by design parameters such as, in particular, wall thicknesses. The elastically flexible properties are realized in terms of construction, in particular, by the wing-like curved design of the connection elements 18. The curvature is aligned in the direction of the respective second free axial end of the respective coupling device part segments 13, 14 depicted in the exemplary embodiment in FIG. 4-8, viewed axially.

Figure 7:
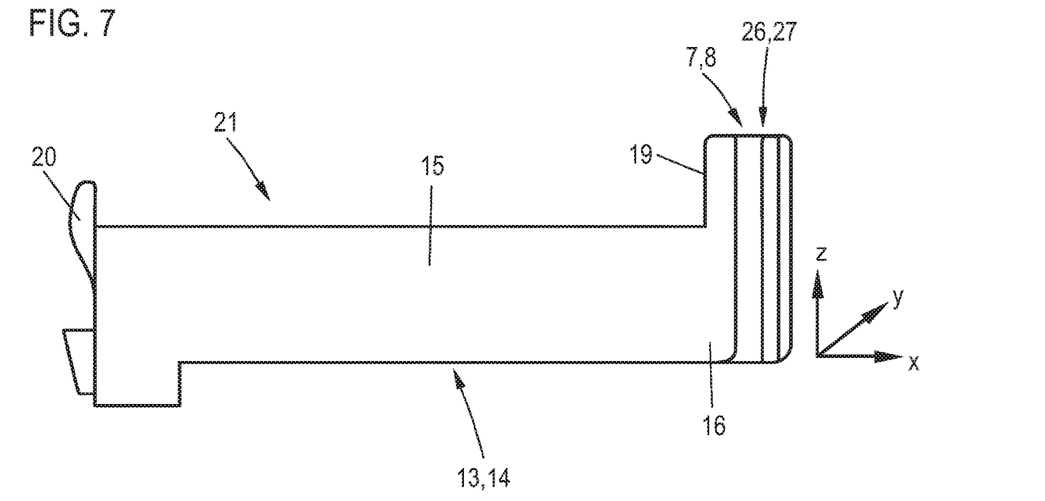

By means of the side view depicted in FIG. 7, in particular, it can be seen that first lug-like retaining sections 19 elevated radially (toward the outside) are formed in the area of respective first free axial ends of respective base sections 15 of respective coupling device part segments 13, 14 opposite the respective base sections 15, and lug-like retaining sections 20 elevated radially (toward the outside) are formed in the area of respective second free axial ends of respective base sections 15 of respective coupling device part segments 13, 14 opposite the respective base sections 15. Respective lug-like retaining sections 19, 20 form a respective axial stop for a strip-, sleeve-, or clamp-like tension element 22 tensioning a respective coupling device part 5, 6, in particular, in a circumferential direction (cf. FIG. 1, 2) and thus define a channel-like retaining area 21, which can also be characterized as or considered a "tension element channel," for retaining a part of a corresponding tension element 22. It can be seen that the seating area 21 in the side view shown in FIG. 7 is approximately in the shape of a U.

Figure 5:
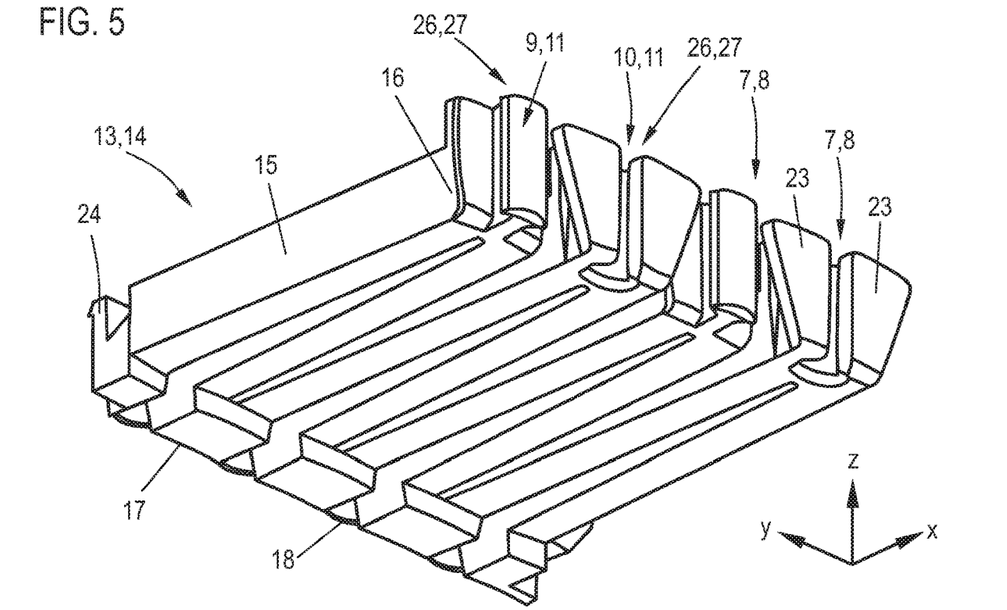
Figure 6:
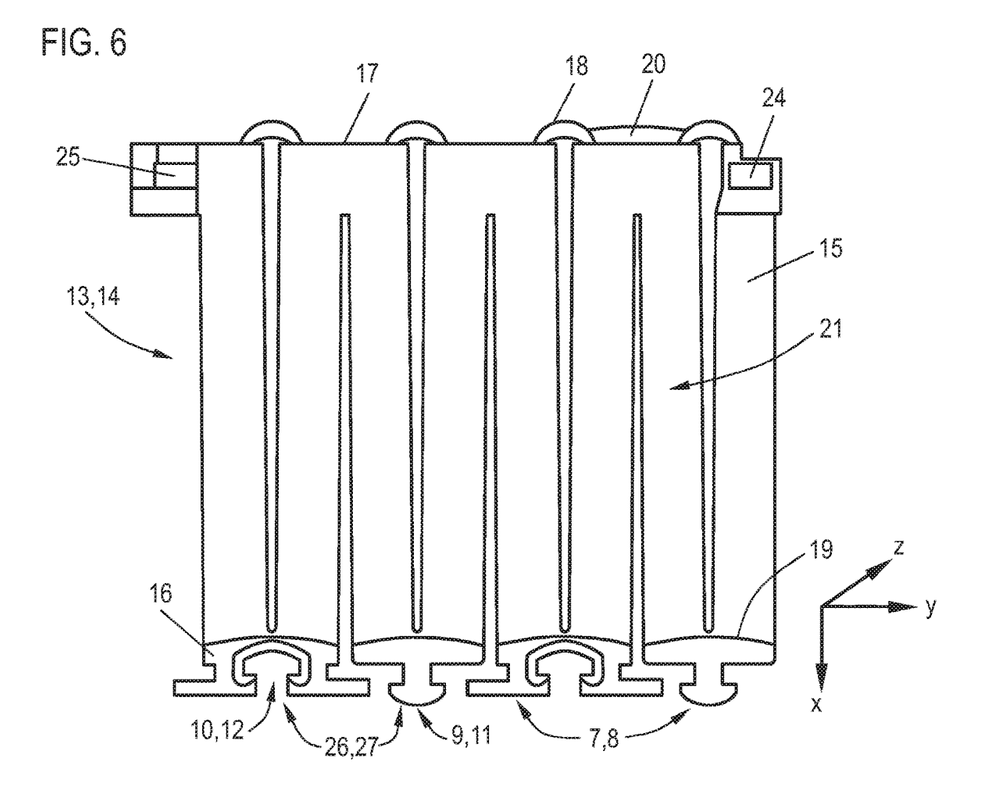

By means of the perspective view shown in FIG. 5, in particular, it can be seen that wing-like contact elements 23 protruding further in a circumferential direction are formed on certain first lug-like retaining sections 19 of the respective coupling device part segments 13, 14. The corresponding contact elements 23 of a first coupling device part segment 13 can be tensioned or are tensioned in a circumferential direction against a section of a second coupling device part 6 positioned opposite this when the device 1 is assembled; the corresponding contact elements 23 of a second coupling device part segment 14 can be tensioned or are tensioned in a circumferential direction against a section of a first coupling device part 5 positioned opposite this when the device 1 is assembled (cf. FIG. 8). The contact elements 23 thus enable a peripheral tensioning of the first coupling device part 5 against the second coupling device part 6, and vice versa.

The corresponding contact elements 23 of a first coupling device part segment 13 are formed in the area of a first positive-locking element 7 forming a seating for a mirror-inverted second positive-locking element 8. In this respect, the corresponding contact elements 23 of a first coupling device part segment 13 can also form peripheral encroachment or overlapping sections for encroaching or overlapping the corresponding contact elements 23 of a second coupling device part segment 14. The corresponding contact elements 23 of a second coupling device part segment 14 are formed in the area of a second positive-locking element 8 forming a receptacle for a mirror-inverted first positive-locking element 7. In this respect, the corresponding contact elements 23 of a second coupling device part segment 14 can form peripheral encroachment or overlapping sections for encroaching or overlapping the corresponding contact elements 23 of a first coupling device part segment 13.

It can be seen that corresponding contact elements 23 have a ramp-like geometric shape rising upward toward the exterior in a radial direction (cf. z-axis). Contact elements 23 arranged adjacent to one another in a circumferential direction of respective coupling device part segments 13, 14 are aligned in opposite directions in a circumferential direction; a first contact element 23 thus has a ramp-like geometric shape rising upward toward the exterior, aligned counterclockwise in radial direction; a second contact element 23 arranged adjacently in a circumferential direction has a corresponding ramp-like geometric shape rising upward toward the exterior, aligned counterclockwise in a radial direction.

In order to realize a peripheral connection between the respective coupling device part segments 13, 14, which is required to form the respective coupling device parts 5, 6, connection elements 24, 25 are formed on respective base sections 15 exposed in a circumferential direction (on one side) of respective coupling device part segments 13, 14, for the peripheral connection of a respective coupling device part segment 13, 14 to a corresponding connection element 24, 25 of an additional respective coupling device part segment 13, 14. The corresponding connection elements 24 are formed as a radial pin-like, optionally undercut, latching protrusion of a corresponding connection element 25 as a breach-like latch seating for the corresponding latching protrusions.

As the double use of reference characters in FIG. 4-7 indicates, respective first coupling device part segments 13 for forming the first coupling device part 5 and respective second coupling device part segments 14 for forming the second coupling device part 6 are identical, i.e. are formed with identical geometric dimensions, i.e. in particular, with an identical geometric shape. Accordingly, it is possible to form or assemble a complete first coupling device part 5, a complete second coupling device part 6, and thus a complete coupling device 4 with multiple geometrically identical structural elements in the form of respective coupling device part segments 13, 14 of a single type. The coupling device part segments 13, 14 shown in FIG. 4-8 can accordingly be considered basic structural units for forming a first coupling device part 5, a second coupling device part 6, and thus for forming a coupling device 4.

In this context, it should also be noted that a first or a second coupling device part segment 13, 14 with a (single) base section 15, having at least one first and/or second positive-locking element 7, 8 formed on a first free axial end or in the area of a first free axial end of the base section 15 (cf. the exemplary embodiment shown in FIG. 3), can likewise be considered a basic structural unit for forming a corresponding segmented first or second coupling device part 5, 6.

First guide elements 26 are formed on respective first coupling device part segments 13, and second guide elements 27 corresponding to the first guide elements 26 are formed on respective second coupling device part segments 14. The corresponding guide elements 26, 27 are formed in the area of respective first free axial ends of respective coupling device part segments 13, 14, i.e. in the area of the respective first connection section 16 of the respective first or second coupling device part segments 13, 14. The first guide elements 26 formed on the respective first coupling device part segments 13 and the second guide elements 27 formed on respective second coupling device part segments 14 are formed to engage the first coupling device part 5 and the second coupling device part 6 or at least one first coupling device part segment 13 and at least one second coupling device part segment 14, forming a guide, which is able to be moved in a radial direction relative to one another. In this respect, the corresponding guide elements 26, 27 can also be considered or characterized as radial guide elements.

The engagement of corresponding guide elements 26, 27 is suitable, in particular, with respect to the connection of pipe elements 2, 3 of unequal outer diameter since a targeted change of the inner diameter of the first coupling device part 5 or of the inner diameter of the second coupling device part 6, is made possible by means of corresponding radial movements, typically radial displacements, of the first coupling device part 5 or respective first coupling device part segments 13 relative to the second coupling device part 6 or the respective second coupling device part segments 14, or vice versa. The coupling device 4 can thereby be adapted to different outer diameters of the pipe elements 2, 3 to be connected in a comparatively simple manner.

It can be seen in the exemplary embodiments depicted in the figures that corresponding guide elements 26, 27 are designed identically, with respect to the geometric construction, with corresponding positive-locking elements 7, 8 having coupling device part segments on the side. The corresponding positive-locking elements 7, 8 are not only designed to engage, in a positive-locking manner, with the second coupling device part 6, forming an axial connection of the first coupling device part 5, but are also designed, forming a guide of the first coupling device part 5 and of the second coupling device part 6 or at least one first coupling device part segment 13 and at least one second coupling device part segment 14, which is able to move in a radial direction relative to one another.

Specifically, this is realized by means of respective first positive-locking elements 7 or respective second positive-locking elements 8 in the form of corresponding protruding sections 9, 11 or corresponding receiving sections 10, 12 for corresponding protruding sections 9, 11 since these positive-locking elements 7, 8 also enable a movable guide of the coupling device parts 5, 6 or of the respective coupling device parts segments 13, 14 in a radial direction relative to one another.

FIG. 1, 8 show that the first coupling device part 5 and the second coupling device part 6 can be connected directly to one another in an axial direction. By reference to FIGS. 2 and 9-11, it will be shown in the following that the first coupling device part 5 and the second coupling device part 6 can be connected indirectly to one another in an axial direction, i.e. with the interconnection of intermediate connecting parts 28.

Figure 2:
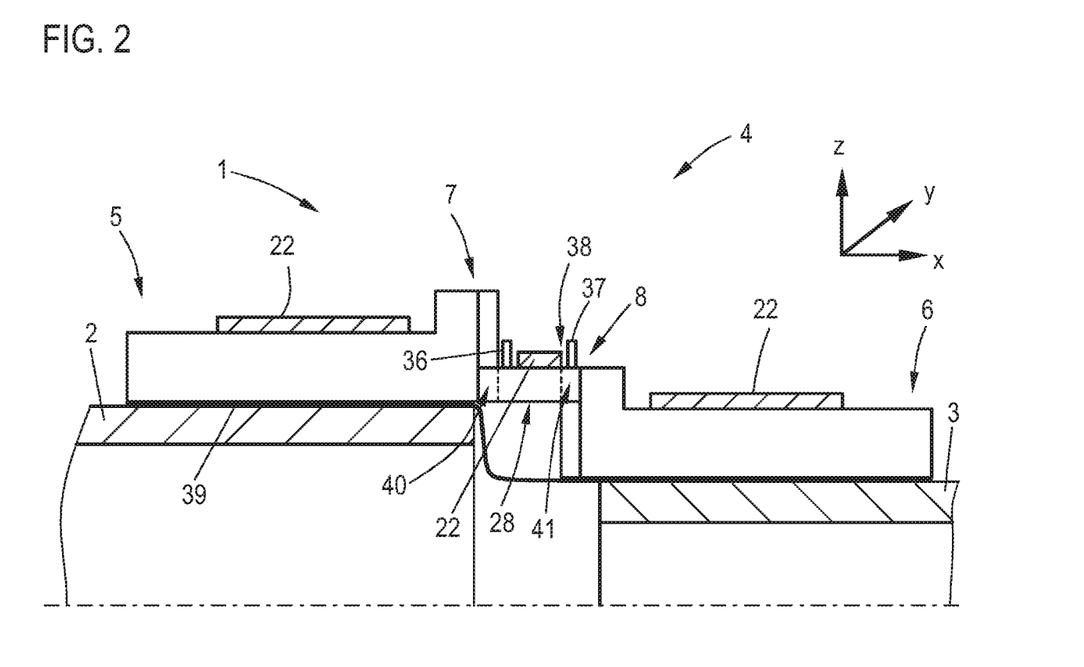

FIG. 2, which depicts a schematic drawing of a longitudinal sectional view of a device 1 in accordance with a further exemplary embodiment, shows that the axially bridgeable distance between two pipe elements 2, 3 to be connected by means of the coupling device 4 can be expanded by means of interconnecting corresponding intermediate connecting parts 28. In connection with the corresponding radial guide elements 26, 27, both on the part of the coupling device parts 5, 6 or respective coupling device part segments 13, 14 and on the part of corresponding intermediate connecting parts 28, the radially bridgeable distance between two pipe elements 2, 3 of unequal outer diameter to be connected by means of the coupling device 4 can be expanded (cf. FIG. 2, z-direction).

Figure 9:
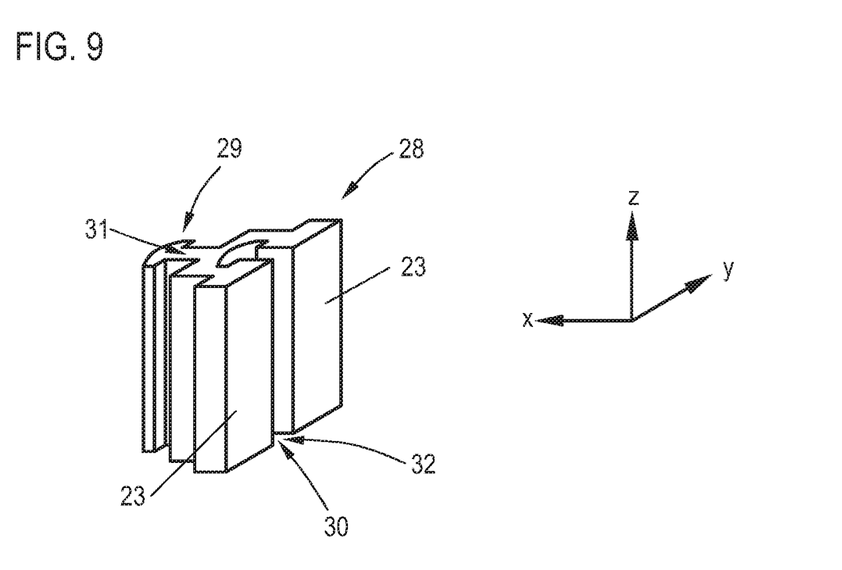
FIG. 9-11 each depict a schematic drawing of an intermediate connecting part in accordance with an exemplary embodiment.
Figure 10:
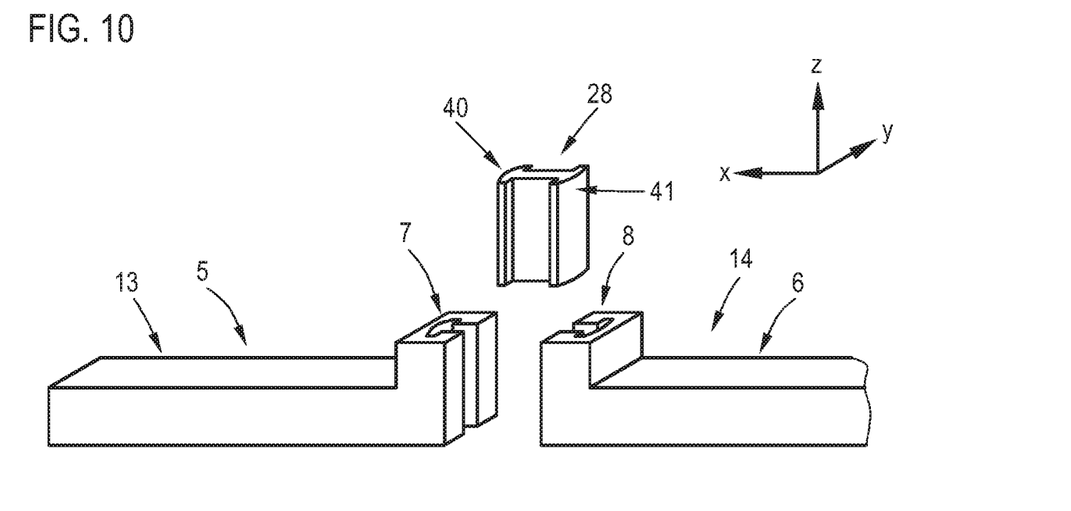
Figure 11:
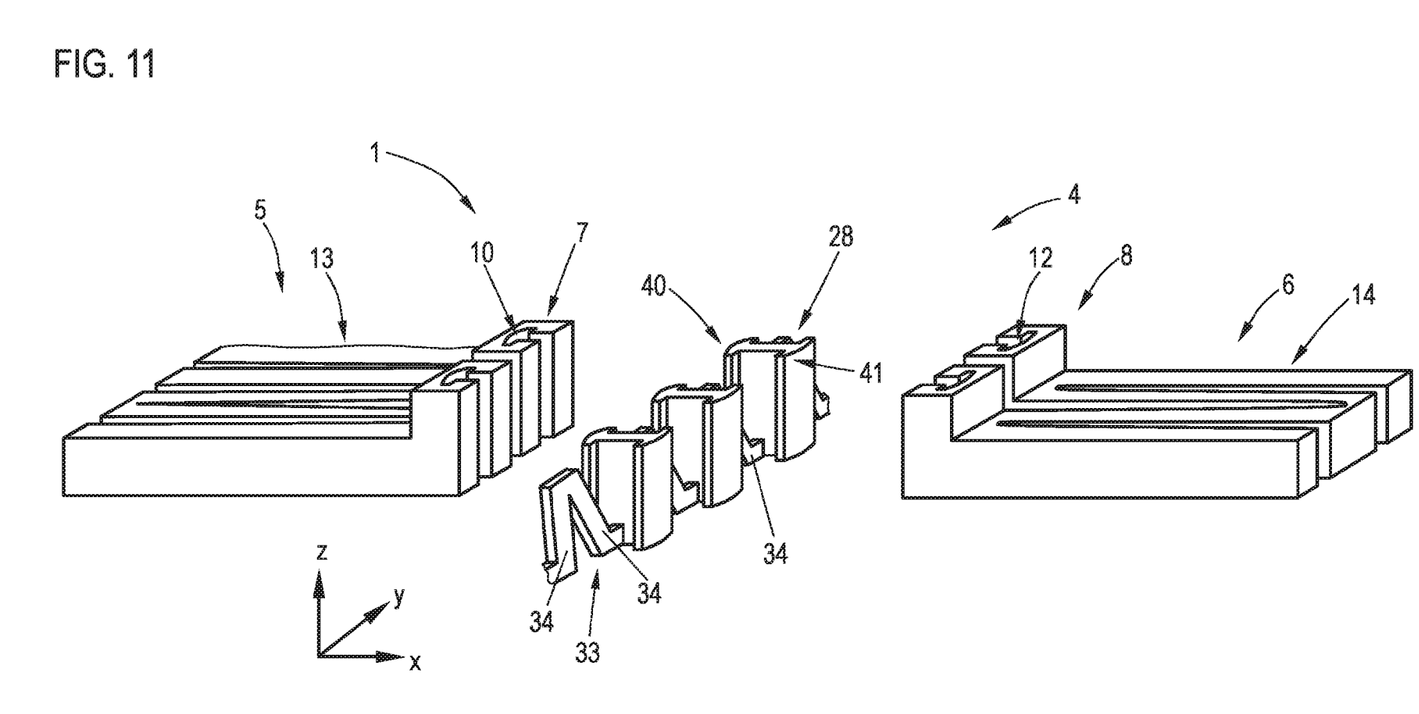

Different configuration options of corresponding intermediate connecting parts 28 are explained by means of FIG. 9-11.

An intermediate connecting part 28 as shown in FIG. 9 has two different positive-locking elements 29, 30 in the opposite axial arrangement. The positive-locking elements 29, 30 enable a connection to a first positive-locking element 7 of the first coupling device part 5 or a first coupling device part segment 13 and to a second positive-locking element 8 of the second coupling device part 6 or of a second coupling device part segment 14. The positive-locking element 29 is in the form of a preferably mushroom-shaped, undercut section 31 protruding axially from the intermediate connecting part 28 for engagement in a corresponding seating section 10, 12 of a coupling device part 5, 6 or a coupling device part segment 13, 14. The positive-locking element 30 is a seating section 32 for receiving a section 9, 11 protruding axially from a coupling device part 5, 6 or a coupling device part segment 13, 14.

It can be seen in FIG. 9 that there are, furthermore, stop elements 23 protruding in a circumferential direction, formed in the intermediate connecting part 28, which can be tensioned or are tensioned in a circumferential direction against a section of a coupling device part 5, 6 opposite this in a circumferential direction when the device 1 is assembled. The corresponding contact elements 23 have a ramp-like geometric shape rising upward toward the exterior in a radial direction (cf. z-axis). Contact elements 23 arranged adjacently in a circumferential direction can be aligned in opposite directions in a circumferential direction.

An intermediate connecting part 28, as shown in FIG. 10, has a positive-locking element 40 for connecting to a first positive-locking element 7 of the first coupling device part 5 or of a first coupling device part segment 13 and at least one positive-locking element 41 for connecting with a second positive-locking element 8 of the second coupling device part 6 or of a second coupling device part segment 14. The positive-locking elements 40, 41 are designed identically with respect to the geometry; the two positive-locking elements 40, 41 are preferably mushroom-shaped, undercut axially protruding sections, which are not further described.

An intermediate connecting part 28, as shown in FIG. 11, has two positive-locking elements 40, 41 corresponding to the positive-locking elements 40, 41 described in connection with the intermediate connecting part 28 shown in FIG. 10. The positive-locking elements 40, 41 are each in the form of a preferably mushroom-shaped, undercut section protruding axially from the intermediate connecting part 28 for engagement in a corresponding receiving section 10, 12 of a coupling device part 5, 6 or a coupling device part segment 13, 14. The positive-locking elements 40, 41 enable a corresponding connection with a first positive-locking element 7 of the first coupling device part 5 or of a first coupling device part segment 13 and with a second positive-locking element 8 of the second coupling device part 6 or of a second coupling device part segment 14.

FIG. 11 shows that intermediate connecting parts 28 arranged adjacently in a circumferential direction are connected to one another by means of a step-like connection element 33 connecting these in a circumferential direction. The strip-like connection element 33 is formed from connection element segments 34, extending at an angle, in particular, V-like, relative to one another, when viewed radially, with the segments being able to be tensioned or being tensioned against one another in a circumferential direction when the device 1 is assembled. The connection element segments 34 provide the connection element 33 with flexibility in various degrees of freedom, i.e. in particular, in an axial direction, in a radial direction, and in a circumferential direction, such that the intermediate connecting parts 28 connected to one another by the connection element 33 can be moved arbitrarily relative to one another. In particular, compression and expansion movements of the connection element 33 are possible so that peripherally adjacent intermediate connecting parts 28 converge on one other to a certain extent or can be spaced apart from one another by a certain distance in a circumferential direction.

The corresponding connection element segments 34 can be formed from a material that is more elastically flexible compared with the intermediate connecting parts 28, e.g. a thermoplastic elastomer that can be injection-molded and thus processed within the scope of an injection-molding process (e.g. in comparison with a comparably rigid polymer, such as polyamide, polycarbonate, etc. for forming the respective intermediate connecting parts 28), or equipped with a more elastically flexible material structure, e.g. by means of slots.

As can be seen in the exemplary embodiment depicted in FIG. 2, corresponding intermediate connecting parts 28 likewise have a bar-shaped base section 35, from a geometric design perspective. The corresponding positive-locking elements 29, 30 formed on a respective intermediate connecting part 28 are formed on or in the area of their respective free axial ends. The intermediate connecting part 28 shown in FIG. 2 is likewise formed with lug-like retaining sections 36, 37 raised radially (toward the exterior) with respect to the base section 35. Respective lug-like retaining sections 36, 37 define a respective axial stop for an additional tension element 22 and thus likewise form a corresponding channel-like retaining area 38 for retaining a part of a further tension element 22.

In order to ensure a reliable, leak-proof connection of corresponding pipe elements 2, 3, the device 1 comprises at least one, in particular, hollow cylindrical, sealing element 39 for an arrangement that is sealed at the inner periphery of the first coupling device part 5, the second coupling device part 6, and the inner periphery of prospective intermediate connecting parts 28, cf. FIG. 11. The sealing element 39 is formed from a sealing material, in particular, an elastomer material such as a natural or synthetic rubber.

Finally, it should be noted that the components of the device 1 described can in particular, comprise components made of metal or plastic. Metals, such as steels, are characterized, in particular, by good mechanical properties as well as production advantages. Plastics, such as thermoplastic or thermosetting polymers that can be injection molded are characterized by a high level of corrosion resistance, low weight, and production advantages.

The invention claimed is:

1. A device for connecting two tubular pipe elements of equal or unequal outer diameter, comprising:
   a hollow cylindrical coupling device with a hollow cylindrical first coupling device part, which can be arranged on or is arranged on a first pipe element, and a hollow cylindrical second coupling device part, which can be arranged on or is arranged on a second pipe element, which is to be axially connected or is axially connected to the first pipe element, which first pipe element and second pipe element are of equal or unequal outer diameter, wherein
   at least one first positive-locking element is arranged or formed on the first coupling device part, and at least one second positive-locking element is arranged or formed on the second coupling device part, wherein
   the at least one first positive-locking element arranged or formed on the first coupling device part and the at least one second positive-locking element arranged or formed on the second coupling device part are designed to engage in a positive-locking manner, forming an axial connection of the first coupling device part with the second coupling device part, wherein
   at least one first guide element is arranged or formed on the first coupling device part or on at least one first coupling device part segment and at least one second guide element corresponding to the at least one first guide element, is arranged or formed on the second coupling device part or on at least one second coupling device part segment, wherein
   the at least one first guide element and the at least one second guide element are shaped to engage with one-another,
   once engaged forming a radially-slidable guide of the first coupling device part axially connected with the second coupling device part, or the at least first coupling device part segment axially connected with the at least second coupling device part segment, which are slidable relative to one another in a radial direction, wherein the first coupling device part is designed so as to be peripherally segmented,
   wherein the first coupling device part is formed from multiple first coupling device part segments, which can be connected or are connected to the first coupling device part segments in a circumferential direction, or
   the second coupling device part is designed so as to be peripherally segmented,
   wherein the second coupling device part is formed from multiple second coupling device part segments, which can be connected or are connected to the second coupling device part segments in a circumferential direction.

2. The device in accordance with claim 1, wherein the first coupling device part segment has at least one bar-shaped base section,
   wherein at least one first positive-locking element is arranged or formed on a first free axial end or in the area of a first free axial end of the bar-shaped base section, or
   a second coupling device part segment has at least one bar-shaped base section,
   wherein at least one second positive-locking element is arranged or formed on a first free axial end or in the area of a second free axial end of the bar-shaped base section.

3. The device in accordance with claim 2, wherein
   the first coupling device part segment has multiple bar-shaped base sections arranged in parallel or at an angle to one another,
   wherein two bar-shaped base sections arranged directly adjacent to one another are connected to one another via a connection section at the first free axial end or in the area of the first free axial end in a circumferential direction,
   wherein at least one first positive-locking element is arranged or formed on the connection section, or
   a second coupling device part segment has multiple bar-shaped base sections arranged in parallel or at an angle to one another,
   wherein two bar-shaped base sections arranged directly adjacent to one another are connected to one another via a connection section at the first free axial end or in the area of the first free axial end in a circumferential direction,
   wherein at least one second positive-locking element is arranged or formed on the connection section.

4. The device in accordance with claim 3, wherein
   at least two bar-shaped base sections of a first coupling device part segment, which are arranged directly adjacent to one another in a circumferential direction, are connected to one another in a circumferential direction, at or in the area of their respective first free axial ends positioned opposite the respective second free axial ends, by means of a U-shaped connection element, or
   at least two bar-shaped base sections of a second coupling device part segment, which are arranged directly adjacent to one another in a circumferential direction, are connected to one another in a circumferential direction, at or in the area of their respective first free axial ends positioned opposite the respective second free axial ends, by means of a bowed connection element.

5. The device in accordance with claim 1, wherein a first lug retaining section, which is radially elevated with respect to a base section, is formed on or in the area of the first free axial end of the at least one base section of at least one first coupling device part segment, and a second retaining section, which is radially elevated with respect to the base section, is formed on or in the area of a second free axial end positioned opposite the first free axial end of at least one base section of at least one first coupling device part segment,
   wherein a retaining area for retaining a part of a tension element tensioning the first coupling device part in a circumferential direction, is formed by the at least one first lug retaining section and the at least one second lug retaining section, or
   a first lug retaining section, which is radially elevated with respect to the base section, is formed on or in the area of the first free axial end of the at least one base section of at least one second coupling device part segment, and a second retaining section, which is radially elevated with respect to the base section, is formed on or in the area of a second free axial end, positioned opposite the first free axial end of the at least one base section of the at least one second coupling device part segment,
   wherein a retaining area for retaining a part of a tension element tensioning the second coupling device part in a circumferential direction, is formed by the at least one first lug retaining section and the at least one second lug retaining section.

6. The device in accordance with claim 5, wherein
   at least one contact element protruding in a circumferential direction is arranged or formed in at least one first retaining section, or in two first retaining sections of a first coupling device part segment, arranged adjacent to one another in a circumferential direction, which can be tensioned or is tensioned in a circumferential direction against a section of the second coupling device part opposite this when the device is assembled, or
   at least one contact element protruding in a circumferential direction is arranged or formed in at least one first retaining section, or in two first retaining sections arranged adjacent to one another in a circumferential direction, of a second coupling device part segment, which can be tensioned or is tensioned in a circumferential direction against a section of the first coupling device part opposite this when the device is assembled.

7. The device in accordance with claim 6, wherein
   at least one contact element of the at least one first coupling device part segment is arranged or formed in the area of the at least one first positive-locking element forming a seating for the second positive-locking element which is mirror-inverted, or
   at least one contact element of the at least one second coupling device part segment is arranged or formed in the area of the at least one second positive-locking element forming a seating for the first positive-locking element which is mirror-inverted.

8. The device in accordance with claim 1, wherein a connection element is arranged or formed in at least one bar-shaped base section of a first coupling device part segment for the peripheral connection of the first coupling device part segment to a corresponding connection element of an additional first coupling device part segment, or
   a connection element is arranged or formed in at least one bar-shaped base section of a second coupling device part segment for the peripheral connection of the second coupling device part segment to a corresponding connection element of an additional second coupling device part segment.

9. The device in accordance with claim 8, wherein a connection element is formed as a radial pin latching protrusion and a corresponding connection element is formed as a breach latch seating for the latching protrusion.

10. The device in accordance with claim 1, wherein the first coupling device part segments and the second coupling device part segments are designed to be identical.

11. The device in accordance with claim 1, wherein a first positive-locking element is a protruding section with an undercut free end or a receiving section for such a protruding section or a section protruding in a circumferential direction from the first coupling device part or a first coupling device part segment for peripheral overlapping with a corresponding section of the second coupling device part or a second coupling device part segment protruding in a circumferential direction, and
   a second positive-locking element is a protruding section with an undercut free end or a seating section for such a protruding section or a section protruding in a circumferential direction from the second coupling device part or a second coupling device part segment for peripheral overlapping with a corresponding section of the first coupling device part or a first coupling device part segment protruding in a circumferential direction.

12. The device in accordance with claim 1, wherein the first coupling device part and the second coupling device part are connected directly to one another in an axial direction or connected indirectly with one another via the interconnection of at least one intermediate connecting part.

13. The device in accordance with claim 12, wherein the at least one intermediate connecting part has at least one positive-locking element for connecting with the at least one first positive-locking element of the first coupling device part and for connecting with the at least one second positive-locking element of the second coupling device part or
   at least one positive-locking element for connecting with the at least one first positive locking element of the first coupling device part or for connecting with the at least one second positive-locking element of the second coupling device part and a second positive-locking element for connecting with an additional intermediate connecting part.

14. The device in accordance with claim 12 or 13, wherein at least two intermediate connecting parts arranged adjacent to one another in a circumferential direction are connected to one another by means of at least one strip-like or strip-shaped, connection element connecting these in a circumferential direction.

15. The device in accordance with claim 12, wherein at least one contact element, protruding in a circumferential direction, is arranged or formed on the at least one intermediate connecting part, which can be tensioned or is tensioned in a circumferential direction against a section of the first coupling device part or the second coupling device part opposite this when the device is assembled.

* * * * *